(12) United States Patent
Okumiya

(10) Patent No.: US 9,778,958 B2
(45) Date of Patent: Oct. 3, 2017

(54) MANAGEMENT METHOD, MANAGEMENT APPARATUS, AND INFORMATION PROCESSING SYSTEM FOR COORDINATING PARALLEL PROCESSING IN A DISTRIBUTED COMPUTING ENVIRONMENT

(71) Applicant: FUJITSU LIMITED, Kawasaki-shi, Kanagawa (JP)

(72) Inventor: Kazuaki Okumiya, Kasugai (JP)

(73) Assignee: FUJITSU LIMITED, Kawasaki (JP)

( * ) Notice: Subject to any disclaimer, the term of this patent is extended or adjusted under 35 U.S.C. 154(b) by 132 days.

(21) Appl. No.: 14/849,831

(22) Filed: Sep. 10, 2015

(65) Prior Publication Data
US 2016/0085597 A1 Mar. 24, 2016

(30) Foreign Application Priority Data
Sep. 19, 2014 (JP) .................................. 2014-191614

(51) Int. Cl.
G06F 9/46 (2006.01)
G06F 9/50 (2006.01)

(52) U.S. Cl.
CPC .................................. *G06F 9/5061* (2013.01)

(58) Field of Classification Search
None
See application file for complete search history.

(56) References Cited

U.S. PATENT DOCUMENTS

2010/0293549 A1* 11/2010 Brelsford .............. G06F 9/5066
718/104

FOREIGN PATENT DOCUMENTS

JP 2001-282551 10/2001
JP 2011-96110 5/2011

* cited by examiner

*Primary Examiner* — Gregory A Kessler
(74) *Attorney, Agent, or Firm* — Oblon, McClelland, Maier & Neustadt, L.L.P.

(57) ABSTRACT

A management method executed by a management apparatus that manages a plurality of information processing apparatuses, the management method includes specifying a first time that is a time at which a predetermined number of information processing apparatuses that execute parallel processing are securable, by referring to information associating a content of processing to be executed by each of the plurality of information processing apparatuses, with a period in which the processing is to be executed; specifying one or more information processing apparatuses respectively having a first period, which is earlier than the first time and in which no processing is to be executed, from among the plurality of information processing apparatuses; and assigning the first period of each of the one or more information processing apparatuses, to preprocessing to be executed before the parallel processing.

20 Claims, 25 Drawing Sheets

FIG. 5

```
#stgin file=f1,f2,f3
        ⋮
#pre node=n1,time=m1
        ⋮        } PREPROCESSING CODE
val-API $val1,$val2
#run node=n2,time=m2
        ⋮        } PARALLEL PROCESSING CODE
val-API $val2,$val3
#after node=n3,time=m3
        ⋮        } POSTPROCESSING CODE
```

FIG. 6

| COMPUTING NODE | ... | TIME | | | | | ... |
|---|---|---|---|---|---|---|---|
| | | 14:05-14:10 | 14:10-14:15 | 14:15-14:20 | 14:20-14:25 | 14:25-14:30 | ... |
| CN1 | ... | JOB A PARALLEL PROCESSING | JOB A PARALLEL PROCESSING | | | | ... |
| CN2 | ... | JOB A PARALLEL PROCESSING | JOB A PARALLEL PROCESSING | JOB A POSTPROCESSING | | JOB B PREPROCESSING | ... |
| CN3 | ... | JOB A PARALLEL PROCESSING | JOB A PARALLEL PROCESSING | JOB A POSTPROCESSING | JOB B PREPROCESSING | JOB B PREPROCESSING | ... |
| ... | ... | | | ... | ... | ... | ... |

FIG. 10

| FILE | SIZE |
|---|---|
| f1 | 50GB |
| f2 | 180GB |
| f3 | 50GB |
| ⋮ | ⋮ |

FIG. 12

| COMPUTING NODE | START TIME OF FREE STATE | ENDING TIME OF FREE STATE | AMOUNT OF TRANSFERRABLE DATA |
|---|---|---|---|
| CN1 | 10:00 | 10:05 | 30GB |

FIG. 13

| COMPUTING NODE | START TIME OF FREE STATE | ENDING TIME OF FREE STATE | AMOUNT OF TRANSFERRABLE DATA |
|---|---|---|---|
| CN1 | 10:00 | 10:10 | 60GB |

FIG. 14

| COMPUTING NODE | START TIME OF FREE STATE | ENDING TIME OF FREE STATE | AMOUNT OF TRANSFERRABLE DATA |
|---|---|---|---|
| CN1 | 10:00 | 10:10 | 60GB |
| CN3 | 10:05 | 10:10 | 30GB |

FIG. 15

| COMPUTING NODE | START TIME OF FREE STATE | ENDING TIME OF FREE STATE | AMOUNT OF TRANSFERRABLE DATA |
|---|---|---|---|
| CN1 | 10:00 | 10:10 | 60GB |
| CN2 | 10:20 | 10:25 | 30GB |
| CN3 | 10:05 | 10:10 | 30GB |

FIG. 16

| COMPUTING NODE | START TIME OF FREE STATE | ENDING TIME OF FREE STATE | AMOUNT OF TRANSFERRABLE DATA |
|---|---|---|---|
| CN1 | 10:00 | 10:10 | 60GB |
| CN2 | 10:20 | 11:00 | 240GB |
| CN3 | 10:05 | 10:10 | 30GB |

FIG. 18

| PROCESSING TYPE | COMPUTING NODE | FILE | FILE SIZE | START POSITION OF TRANSFER | TRANSFER DATA AMOUNT |
|---|---|---|---|---|---|
| TRANSFER 1 | CN1 | f1 | 50GB | 0 | 50GB |
| TRANSFER 2 | CN1 | f2 | 180GB | 30GB-1B | 10GB |
| TRANSFER 3 | CN2 | f2 | 180GB | 40GB-1B | 140GB |
| TRANSFER 4 | CN2 | f3 | 50GB | 0 | 50GB |
| TRANSFER 5 | CN3 | f2 | 180GB | 0 | 30GB |

FIG. 19

| COMPUTING NODE | START TIME OF FREE STATE | ENDING TIME OF FREE STATE | AMOUNT OF TRANSFERRABLE DATA |
|---|---|---|---|
| CN1 | 10:00 | 10:10 | 10GB |
| CN2 | 10:20 | 11:00 | 240GB |
| CN3 | 10:05 | 10:10 | 30GB |

FIG. 20

| COMPUTING NODE | START TIME OF FREE STATE | ENDING TIME OF FREE STATE | AMOUNT OF TRANSFERRABLE DATA |
|---|---|---|---|
| CN1 | 10:00 | 10:10 | 10GB |
| CN2 | 10:20 | 11:00 | 240GB |
| CN3 | 10:05 | 10:10 | 0GB |

FIG. 21

| COMPUTING NODE | START TIME OF FREE STATE | ENDING TIME OF FREE STATE | AMOUNT OF TRANSFERRABLE DATA |
|---|---|---|---|
| CN1 | 10:00 | 10:10 | 0GB |
| CN2 | 10:20 | 11:00 | 240GB |
| CN3 | 10:05 | 10:10 | 0GB |

FIG. 22

| COMPUTING NODE | START TIME OF FREE STATE | ENDING TIME OF FREE STATE | AMOUNT OF TRANSFERRABLE DATA |
|---|---|---|---|
| CN1 | 10:00 | 10:10 | 0GB |
| CN2 | 10:20 | 11:00 | 100GB |
| CN3 | 10:05 | 10:10 | 0GB |

FIG. 23

| COMPUTING NODE | START TIME OF FREE STATE | ENDING TIME OF FREE STATE | AMOUNT OF TRANSFERRABLE DATA |
|---|---|---|---|
| CN1 | 10:00 | 10:10 | 0GB |
| CN2 | 10:20 | 11:00 | 50GB |
| CN3 | 10:05 | 10:10 | 0GB |

MANAGEMENT METHOD, MANAGEMENT APPARATUS, AND INFORMATION PROCESSING SYSTEM FOR COORDINATING PARALLEL PROCESSING IN A DISTRIBUTED COMPUTING ENVIRONMENT

CROSS-REFERENCE TO RELATED APPLICATION

This application is based upon and claims the benefit of priority of the prior Japanese Patent Application No. 2014-191614, filed on Sep. 19, 2014, the entire contents of which are incorporated herein by reference.

FIELD

The embodiment discussed herein is related to a management method, a management apparatus, and an information processing system.

BACKGROUND

In an information processing system that executes a job according to an instruction from a user, when user instructions are concentrated in a specific time frame, computing resources are insufficient and thus, it is difficult to execute a job. Therefore, in a related technique, a mechanism (hereinafter referred to as "scheduler") that manages a job execution schedule is provided in an information processing system, to avoid a shortage of computing resources during job execution.

A job including parallel processing is called a parallel job. The parallel job includes not only the parallel processing but also processing except for the parallel processing. The processing except for the parallel processing includes, for example, processing to prepare for the parallel processing (called "preprocessing"), processing to complete the parallel processing (called "postprocessing"), and the like.

The processing except for the parallel processing may be executed without securing the same number of computing nodes as the number of computing nodes used for execution of the parallel processing. Therefore, during execution of the processing except for the parallel processing, some of the computing nodes assigned to the parallel job may be unused and thus, utilization of the computing resources in the information processing system may decrease. The above-described related technique does not focus on such a problem. In the information processing system, effectively utilizing the computing nodes that execute the parallel job is desirable. As related art, for example, Japanese Laid-open Patent Publication Nos. 2001-282551 and 2011-096110 are disclosed.

SUMMARY

According to an aspect of the invention, a management method executed by a management apparatus that manages a plurality of information processing apparatuses, the management method includes specifying a first time that is a time at which a predetermined number of information processing apparatuses that execute parallel processing are securable, by referring to information associating a content of processing to be executed by each of the plurality of information processing apparatuses, with a period in which the processing is to be executed; specifying one or more information processing apparatuses respectively having a first period, which is earlier than the first time and in which no processing is to be executed, from among the plurality of information processing apparatuses; and assigning the first period of each of the one or more information processing apparatuses, to preprocessing to be executed before the parallel processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a parallel-job execution program stored in an input-data storage section;

FIG. 6 is a diagram illustrating an example of data stored in a resource-map storage section;

FIG. 10 is a diagram illustrating an example of data used to manage a size of each file;

FIG. 12 is a diagram illustrating an example of an assignment table;

FIG. 13 is a diagram provided to explain a state transition of the assignment table;

FIG. 14 is a diagram provided to explain a state transition of the assignment table;

FIG. 15 is a diagram provided to explain a state transition of the assignment table;

FIG. 16 is a diagram provided to explain a state transition of the assignment table;

FIG. 18 is a diagram illustrating an example of data stored in a transfer table;

FIG. 19 is a diagram provided to explain a state transition of the assignment table;

FIG. 20 is a diagram provided to explain a state transition of the assignment table;

FIG. 21 is a diagram provided to explain a state transition of the assignment table;

FIG. 22 is a diagram provided to explain a state transition of the assignment table;

FIG. 23 is a diagram provided to explain a state transition of the assignment table;

DESCRIPTION OF EMBODIMENT

Figure 1:
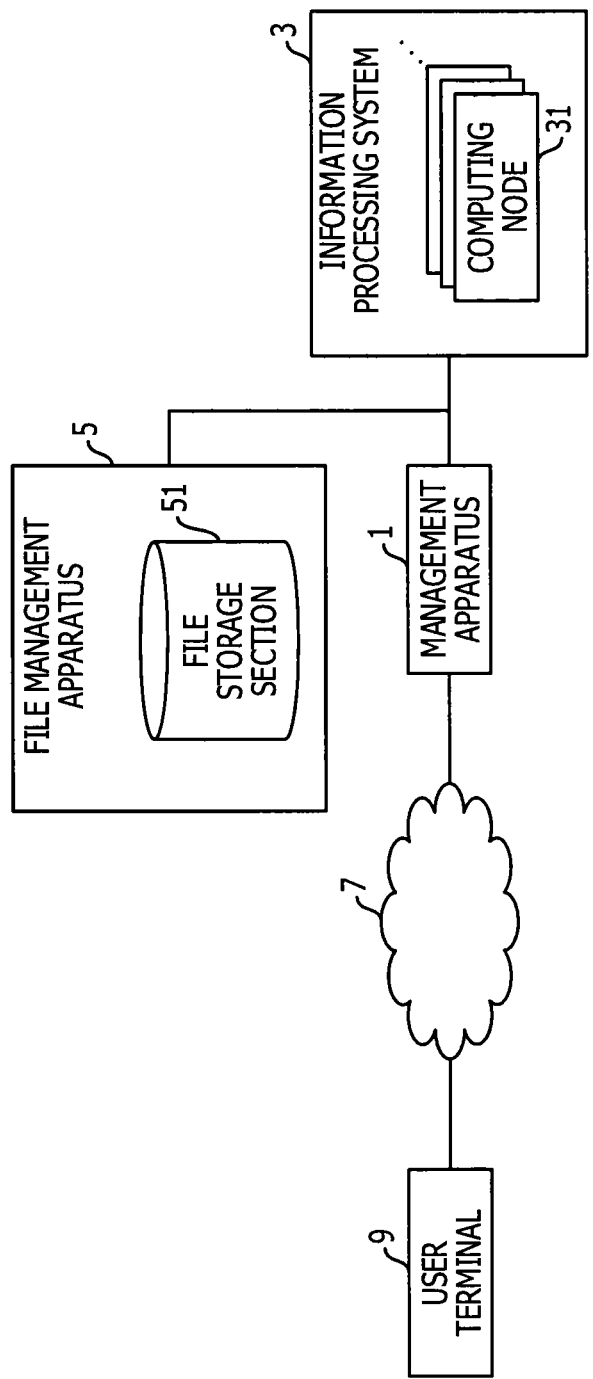
FIG. 1 is a diagram illustrating an overview of a system according to an embodiment.

FIG. 1 illustrates an overview of a system according to an embodiment. A management apparatus 1, which executes main processing in the present embodiment, and a user terminal 9 to be operated by a user are connected to a network 7 that is, for example, the Internet. The management apparatus 1 is connected to a file management apparatus 5 including a file storage section 51, and an information processing system 3 including computing nodes 31, via, for example, a network such as a local area network (LAN).

The user terminal 9 transmits an execution request for a parallel job, to the management apparatus 1. The management apparatus 1 performs scheduling for the parallel job designated in the execution request. Further, the management apparatus 1 causes the computing nodes 31 in the information processing system 3 to execute the parallel job according to a schedule. The computing nodes 31 in the information processing system 3 execute the parallel job. A file to be used by the computing nodes 31 in parallel processing in the parallel job is stored in the file storage section 51 of the file management apparatus 5.

Figure 2:
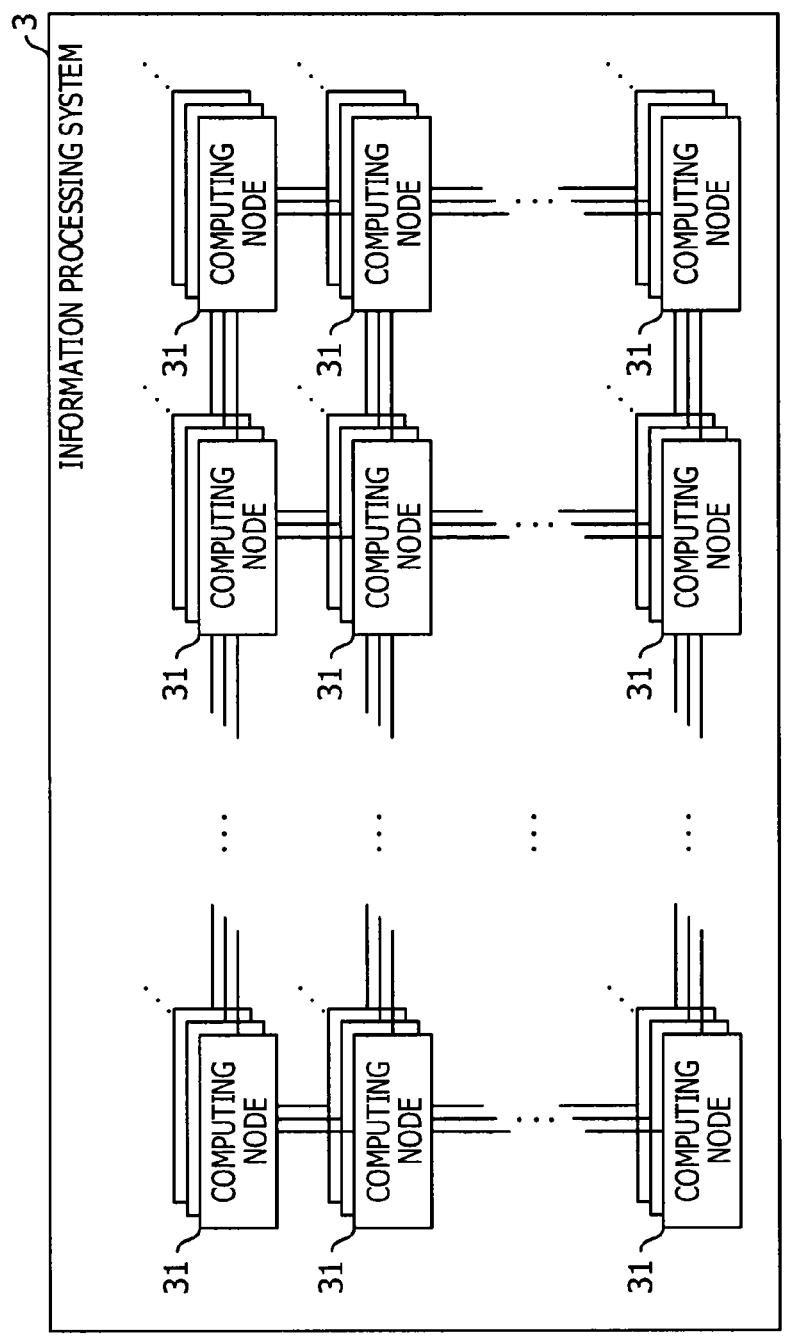
FIG. 2 is a diagram illustrating an example of a connection mode of computing nodes.
Figure 3:
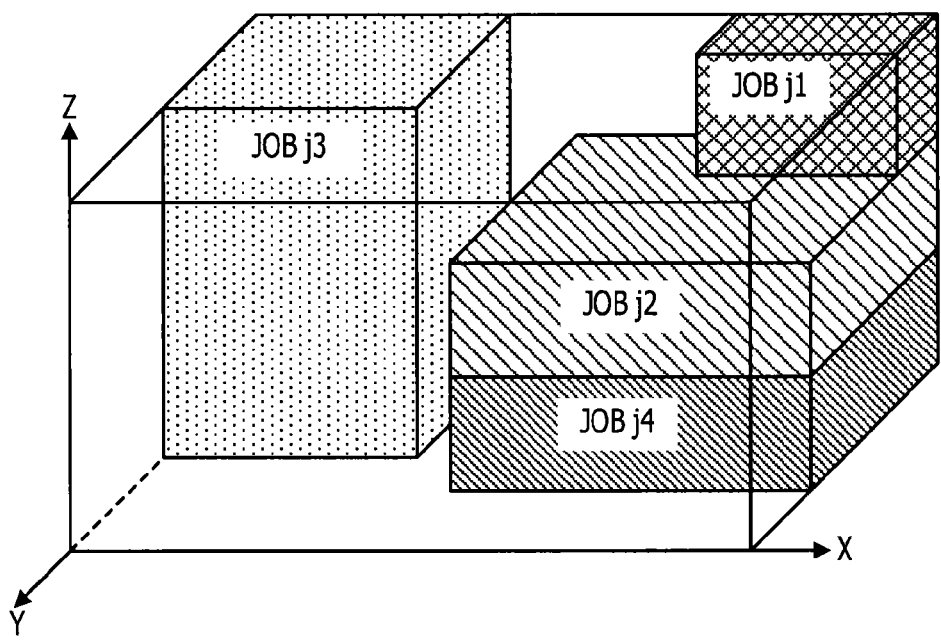
FIG. 3 is a diagram illustrating an example of a space shape designated by a user.

FIG. 2 illustrates an example of a connection mode of the computing nodes 31. The computing nodes 31 are connected in a mesh, as illustrated in FIG. 2. In the present embodiment, a shape of a space formed by the computing nodes 31 that execute the parallel processing may be designated by a user. For example, in FIG. 3, the computing nodes 31 are assigned to a job J1, a job J2, a job J3, and a job J4. The shape of a space occupied by the computing nodes 31 that execute each job is a rectangular solid. In this way, the computing node 31 that does not execute the parallel processing may be absent, among the computing nodes 31 that execute the parallel processing. This allows suppression of generation of a communication processing load, in the computing node 31 that does not execute the parallel processing.

Figure 4:
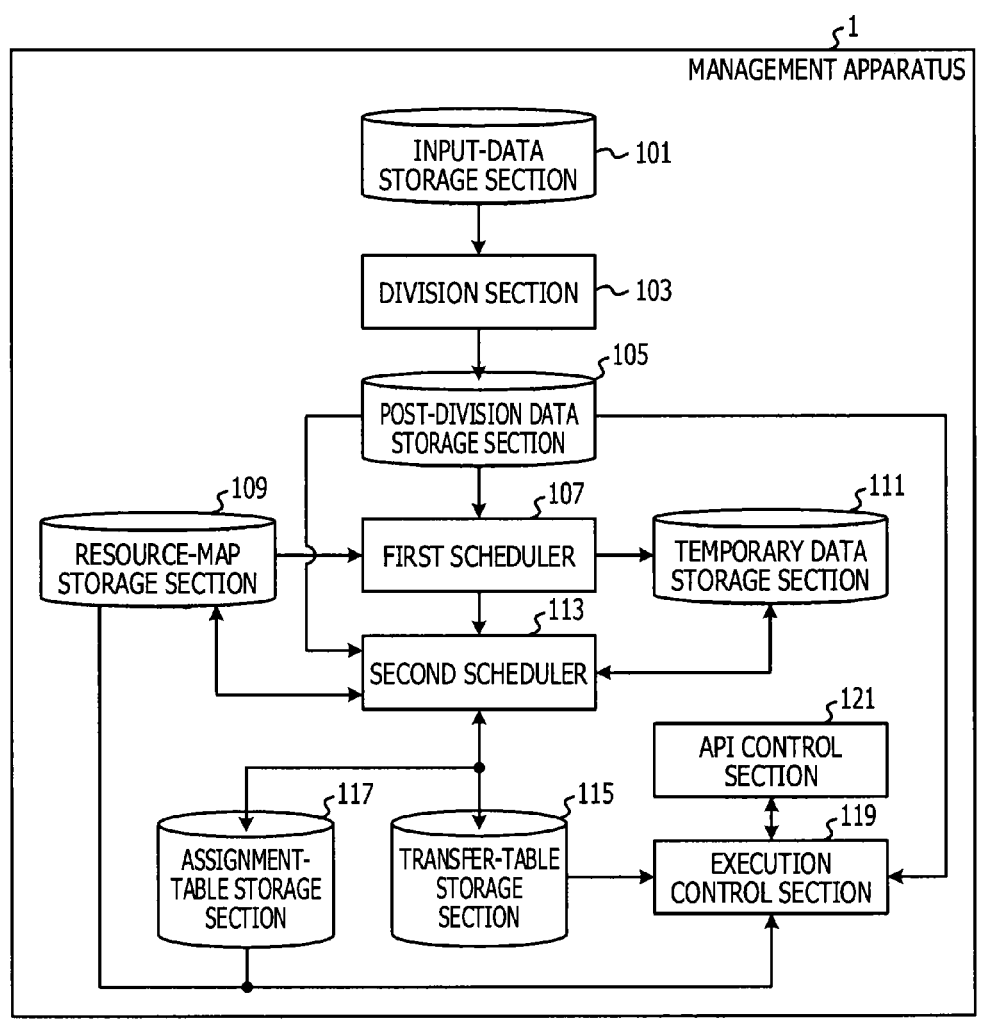
FIG. 4 illustrates a functional block diagram of a management apparatus.

FIG. 4 illustrates a functional block diagram of the management apparatus 1. The management apparatus 1 includes an input-data storage section 101, a division section 103, a post-division data storage section 105, a first scheduler 107, a resource-map storage section 109, a temporary data storage section 111, a second scheduler 113, a transfer-table storage section 115, an assignment-table storage section 117, an execution control section 119, and an application programming interface (API) control section 121.

The division section 103 executes processing based on data stored in the input-data storage section 101. The division section 103 then stores a processing result, in the post-division data storage section 105. The first scheduler 107 executes processing, by using data stored in the post-division data storage section 105 and data stored in the resource-map storage section 109. The first scheduler 107 then stores a processing result, in the temporary data storage section 111. The second scheduler 113 performs processing, by using data stored in the post-division data storage section 105, data stored in the resource-map storage section 109, data stored in the temporary data storage section 111, and data stored in the transfer-table storage section 115. The second scheduler 113 then stores a processing result, in the resource-map storage section 109 and the assignment-table storage section 117. The API control section 121 receives information to be passed to the next processing, from the computing nodes 31 in the information processing system 3, and outputs the received information to the execution control section 119. The execution control section 119 controls execution of a parallel job by the computing nodes 31 in the information processing system 3, by using data stored in the post-division data storage section 105, data stored in the resource-map storage section 109, data stored in the assignment-table storage section 117, and the information received from the API control section 121.

FIG. 5 illustrates an example of a parallel-job execution program stored in the input-data storage section 101. The parallel-job execution program is included in the execution request received from the user terminal 9. The parallel-job execution program includes a part for parallel processing (including parallel processing code in FIG. 5), and a part for processing except for the parallel processing. The part for the processing except for the parallel processing includes a part for preprocessing (including preprocessing code in FIG. 5), a part for postprocessing (including postprocessing code in FIG. 5), and other part. The other part includes, for example, information about file transfer (for example, identification information of a file to be used in the parallel processing, and identification information of a file to be generated by the parallel processing).

The preprocessing includes, for example, processing of transferring a file to be used in initialization processing and the parallel processing to the information processing system 3. The postprocessing includes processing of updating a file stored in the file storage section 51, with a file updated by the parallel processing. The file to be used in the parallel processing is transferred to the information processing system 3. Therefore, the computing nodes 31 that execute the parallel processing are allowed to access the file rapidly. As a result, a length of time taken by the parallel processing is reduced.

FIG. 6 illustrates an example of data stored in the resource-map storage section 109. In the example of FIG. 6, for each of the computing nodes 31, information indicating processing to be executed by the computing node 31 in each time frame is stored.

Figure 7:
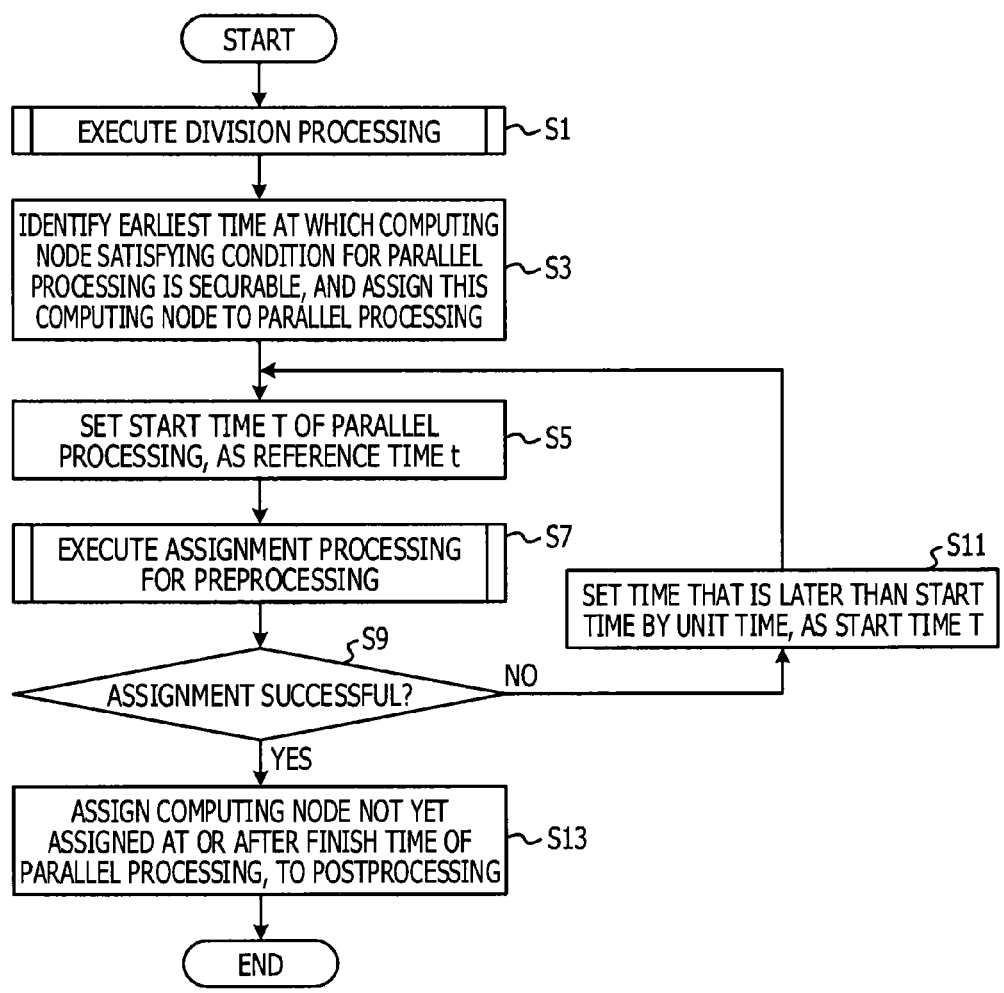
FIG. 7 is a diagram illustrating a main processing flow.

Next, operation of the management apparatus 1 will be described using FIG. 7 to FIG. 24. First, the management apparatus 1 receives an execution instruction for a parallel job from the user terminal 9, and stores an execution program included in the execution instruction into the input-data storage section 101. The management apparatus 1 initializes the post-division data storage section 105, the temporary data storage section 111, the assignment-table storage section 117, and the transfer-table storage section 115. In response to this initialization, the division section 103 executes division processing (FIG. 7: S1). The division processing will be described using FIG. 8.

Figure 8:
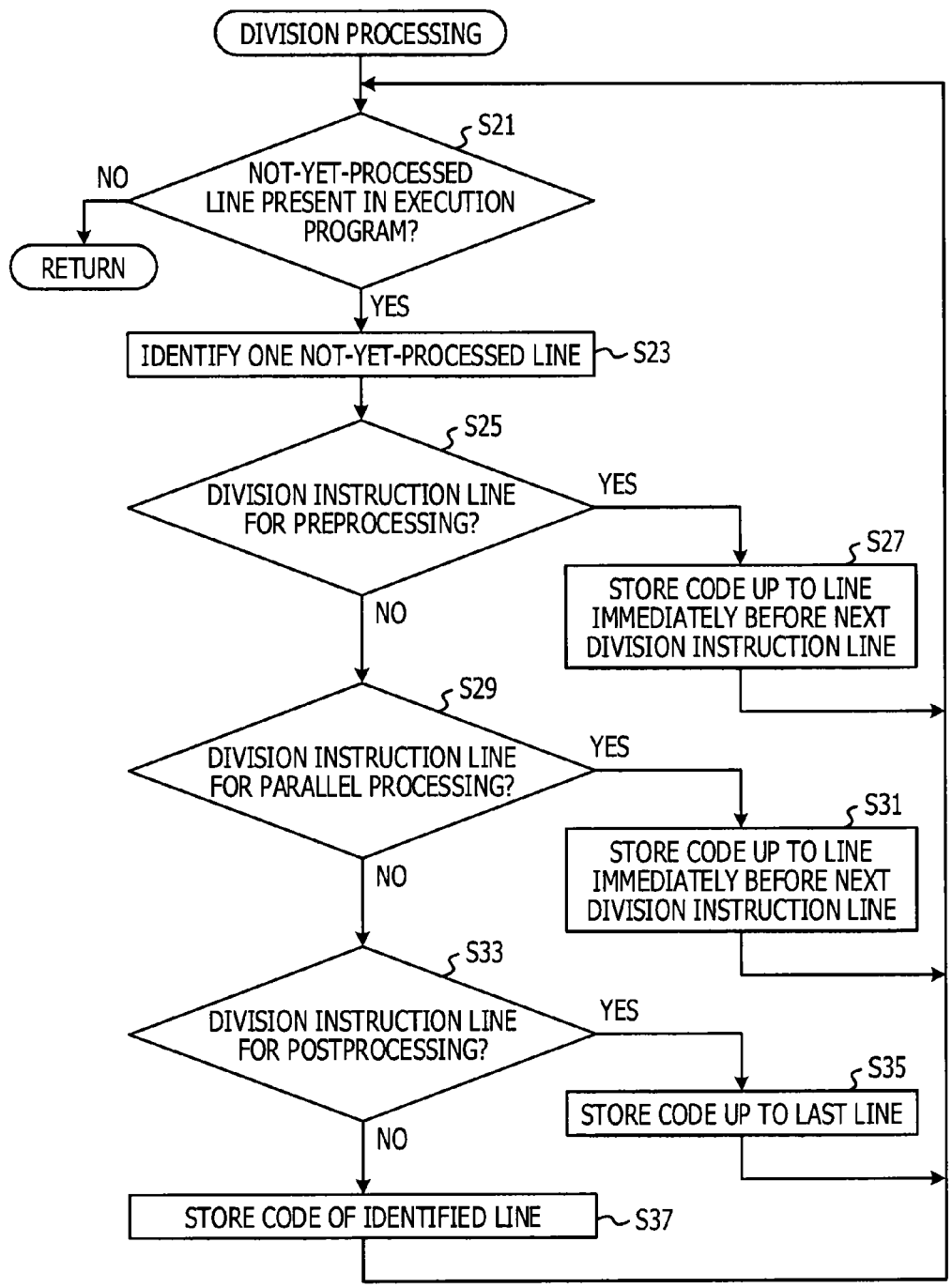
FIG. 8 is a diagram illustrating a processing flow of division processing.

First, the division section 103 determines whether there is a not-yet-processed line in the execution program read from the input-data storage section 101 (FIG. 8: S21). When it is determined that there is no not-yet-processed line (S21: No route), the processing returns to calling processing.

When determining that there is a not-yet-processed line (S21: Yes route), the division section 103 identifies one not-yet-processed line in the execution program (S23). When executing S23 for the first time, the division section 103 identifies the first line in the execution program as a not-yet-processed line. When executing S23 not for the first time, the division section 103 identifies a line with the smallest line number, among not-yet-processed lines.

The division section 103 determines whether the line identified in S23 is a division instruction line for preprocessing (S25). The division instruction line is a line registered beforehand and to become a mark for division. For example, in FIG. 5, each of a line beginning with "#pre", a line beginning with "#run", and a line beginning with "#after" is the division instruction line. The division instruction line for preprocessing is the line beginning with "#pre".

When determining that the line identified in S23 is the division instruction line for preprocessing (S25: Yes route), the division section 103 stores code starting from the identified division instruction line and ending at a line immediately before the next division instruction line (for example, a division instruction line for parallel processing), in an area for storage of a program for preprocessing, in the post-division data storage section 105 (S27). The flow then returns to S21.

When determining that the line identified in S23 is not the division instruction line for preprocessing (S25: No route), the division section 103 determines whether the line identified in S23 is the division instruction line for parallel processing (S29). For example, in FIG. 5, the division instruction line for parallel processing is the line beginning in "#run".

When determining that the line identified in S23 is the division instruction line for parallel processing (S29: Yes route), the division section 103 stores code starting from the identified division instruction line and ending at a line immediately before the next division instruction line (for example, a division instruction line for postprocessing), in an area for storage of a program for parallel processing, in the post-division data storage section 105 (S31). The flow then returns to S21.

When determining that the line identified in S23 is not the division instruction line for parallel processing (S29: No route), the division section 103 determines whether the line identified in S23 is the division instruction line for postprocessing (S33). For example, in FIG. 5, the division instruction line for postprocessing is the line beginning with "#after".

When determining that the line identified in S23 is the division instruction line for postprocessing (S33: Yes route), the division section 103 stores code starting from the identified division instruction line and ending at the last line, in an area for storage of a program for postprocessing, in the post-division data storage section 105 (S35). The flow then returns to S21.

When determining that the line identified in S23 is not the division instruction line for postprocessing (S33: No route), the division section 103 stores code of the line identified in S23, in an area for storage of other program, in the post-division data storage section 105 (S37). The flow then returns to S21.

By executing the processing described above, a program of a parallel job may be divided, and a program may be generated each time processing is executed. Therefore, scheduling may be performed processing by processing in a job, not job by job.

Referring back to FIG. 7, the first scheduler 107 detects storage of data into the post-division data storage section 105. Subsequently, based on the data stored in the resource-map storage section 109, the first scheduler 107 identifies the earliest time at which the computing node 31 satisfying a condition for the parallel processing is securable. The first scheduler 107 then assigns this computing node 31 to the parallel processing (S3). The first scheduler 107 generates a copy of the data stored in the resource-map storage section 109. The first scheduler 107 then updates the generated copy based on a processing result of S3, and stores the updated copy in the temporary data storage section 111.

The condition for the parallel processing includes, for example, a condition of the number of the computing nodes 31 to execute the parallel processing, and a condition of a time length to be taken by the parallel processing. In the example of FIG. 5, a part indicating "node=n2, time=m2" in the line beginning with "#run" corresponds to the condition for the parallel processing. In this case, the first scheduler 107 ensures that the identified time is the earliest time at which the n2 computing nodes 31 may be secured, and that the n2 computing nodes 31 may be secured for m2 (minutes) starting from the identified time.

The second scheduler 113 detects storage of a processing result of the first scheduler 107 into the temporary data storage section 111. In response to this detection, the second scheduler 113 sets a start time T of the parallel processing, as a reference time t (S5). The start time T of the parallel processing is the time identified in S3.

Next, the second scheduler 113 executes assignment processing for the preprocessing (S7). The assignment processing will be described using FIG. 9 to FIG. 23.

Figure 9:
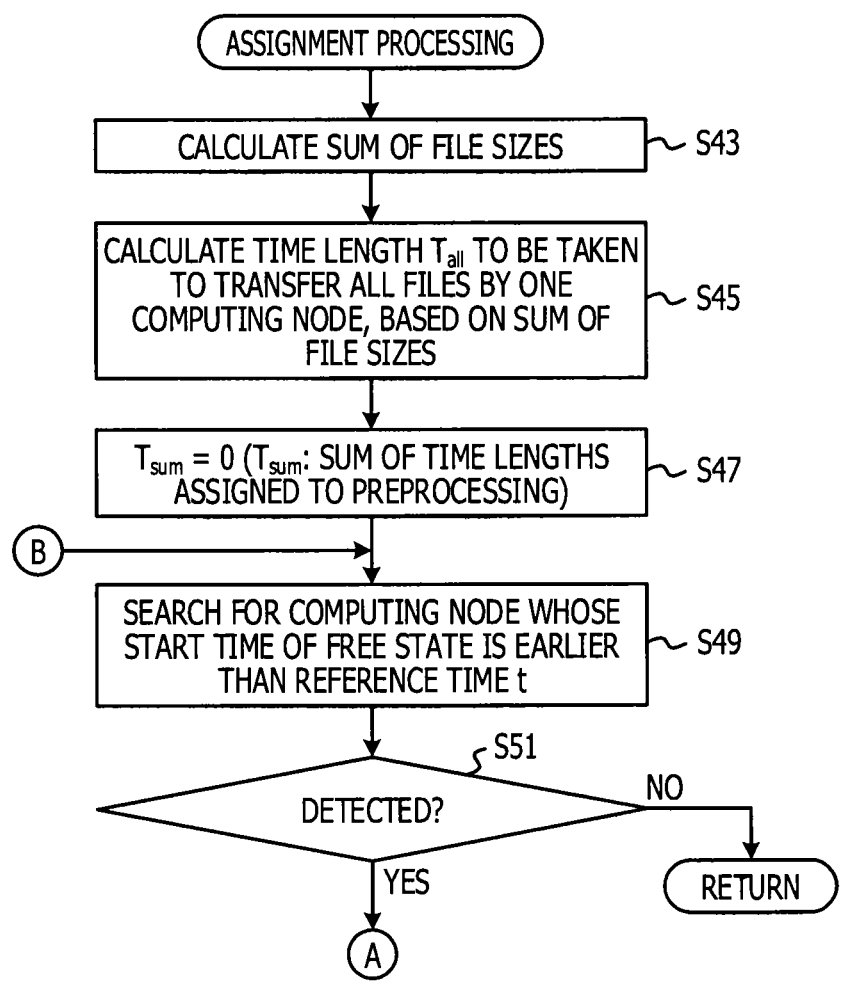
FIG. 9 is a diagram illustrating a processing flow of assignment processing.
Figure 10:
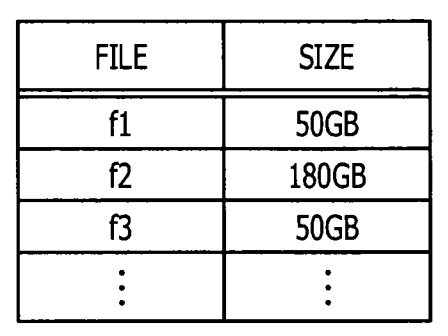

First, the second scheduler 113 calculates a sum of sizes of respective files to be used in the parallel processing (FIG. 9: S43). For example, the files to be used in the parallel processing are designated by the other program stored in the post-division data storage section 105. For example, in FIG. 5, pieces of identification information of the respective files are included in a line beginning with "#stgin", and the files indicated by these pieces of identification information are to be used in the parallel processing. The other program includes information representing the size of each file to be used in the parallel processing, and therefore, the sum of the sizes of the respective files to be used in the parallel processing may be calculated. As for the information representing the size of the file to be used in the parallel processing, the second scheduler 113 may manage data illustrated in FIG. 10, for example. In other words, the second scheduler 113 may acquire beforehand the identification information of the file to be used in the parallel processing and the size of the file, and may store the acquired identification information and size, into a storage area.

Referring back to FIG. 9, the second scheduler 113 calculates a time length $T_{all}$ to be taken to transfer all files by the one computing node 31, based on the sum of the sizes of the respective files (S45). A transfer rate of the computing node 31 is determined beforehand. Therefore, the second scheduler 113 calculates "$T_{all}$", based on "$T_{all}$=(sum of sizes of respective files)/(transfer rate)".

The second scheduler 113 sets 0, as $T_{sum}$ that is a sum of the time lengths assigned to the preprocessing (S47).

By using the data stored in the resource-map storage section 109, the second scheduler 113 searches for the computing node 31 whose start time of a free state (for example, a state where no processing is executed) is earlier than the reference time t set in S5 (S49). For instance, in the example illustrated in FIG. 6, when the reference time t is 14:25, a computing node CN1 and a computing node CN2 are detected.

When no computing node 31 whose start time of a free state is earlier than the reference time t is detected in S49 (S51: No route), the processing returns to the calling processing. On the other hand, the computing node 31 whose start time of a free state is earlier than the reference time t is detected (S51: Yes route), the processing shifts to S53 in FIG. 11, via a terminal A.

Figure 11:
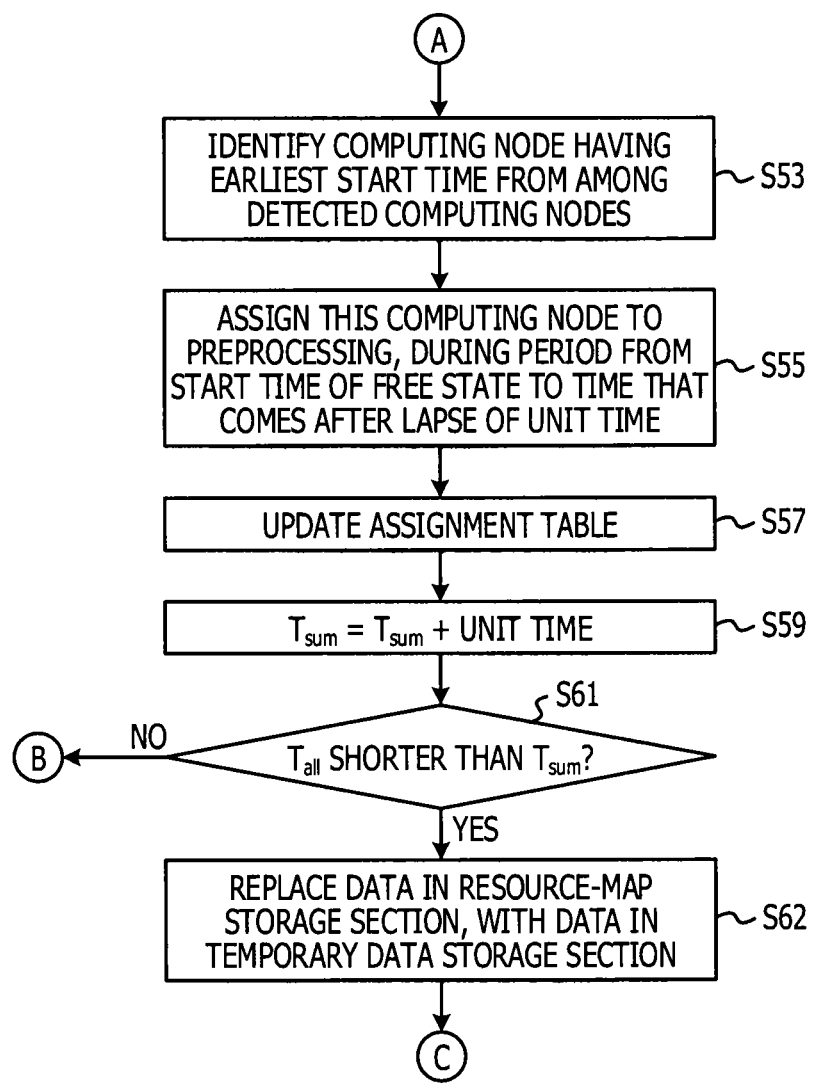
FIG. 11 is a diagram illustrating a processing flow of the assignment processing.
Figure 17:
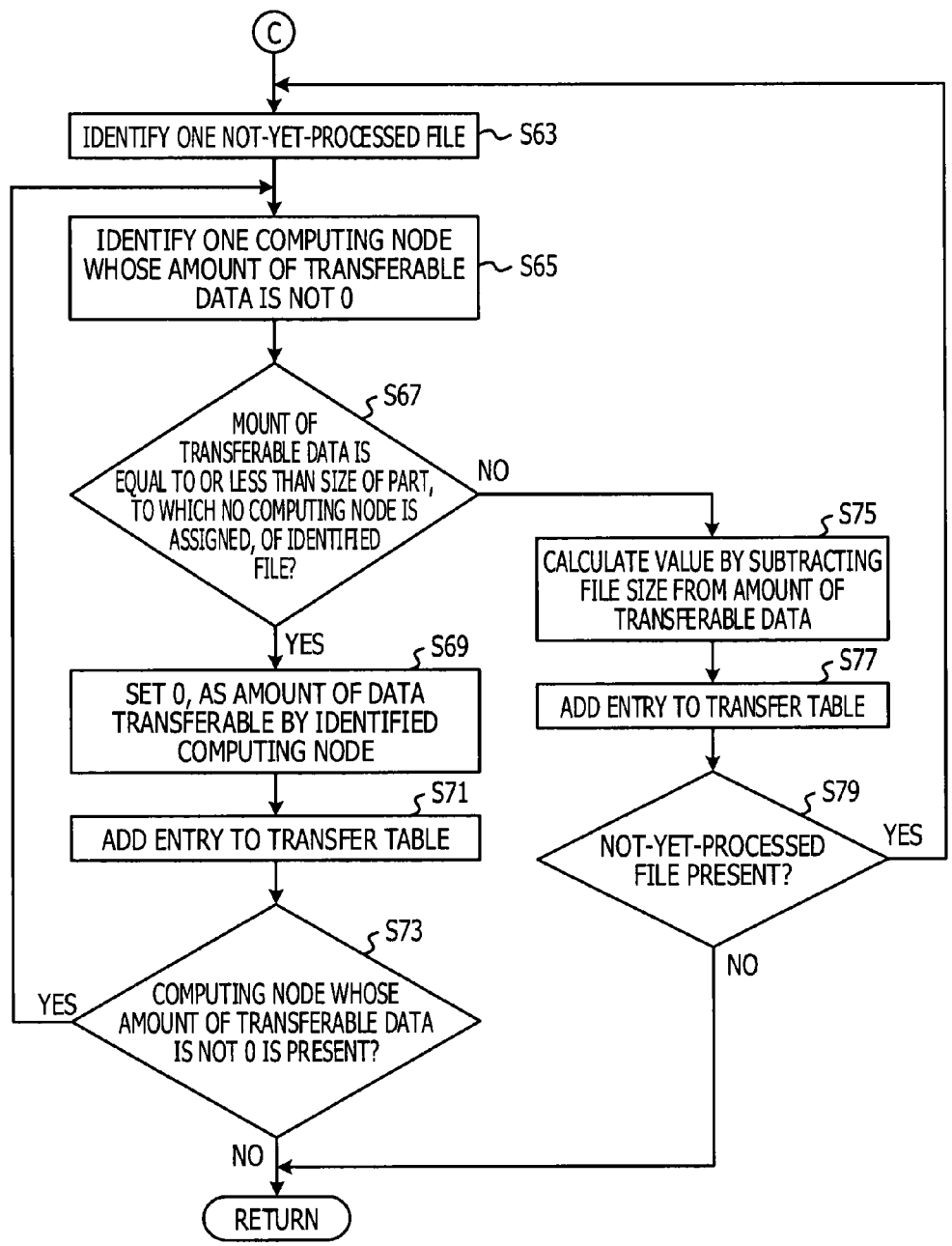
FIG. 17 is a diagram illustrating a processing flow of the assignment processing.

Next, FIG. 11 will be described. The second scheduler 113 identifies the computing node 31 having the earliest start time, from among the computing nodes 31 detected in S51 (FIG. 11: S53).

The second scheduler 113 assigns the computing node 31 identified in S53 to the preprocessing, during a period from the start time of the free state to a time that comes after a lapse of a unit time (S55). The second scheduler 113 updates the data stored in the temporary data storage section 111, based on a processing result of S55.

Specifically, the second scheduler 113 updates an assignment table stored in the assignment-table storage section 117, based on the processing result of S55 (S57). FIG. 12 illustrates an example of the data stored in the assignment table. In the example of FIG. 12, the stored data includes the identification information of the computing node 31, the start time of a free state, the ending time of the free state, and the amount of data transferable during a time period from the start time of the free state to the ending time of the free state. In the example of FIG. 12, the unit time is five minutes.

Here, state transitions of the assignment table will be described using FIG. 13 to FIG. 16.

For example, in the state illustrated in FIG. 12, adding a free time of the computing node CN1 results in entries for the computing node CN1 in the assignment table as illustrated in FIG. 13. In FIG. 13, the ending time of the free state is changed to 10:10, and the amount of transferable data is changed to 60 GB (gigabytes). A part different from FIG. 12 is shaded.

When a free time of a computing node CN3 is added in the state illustrated in FIG. 13, entries for the computing node CN3 are added to the assignment table, resulting in a state illustrated in FIG. 14. In FIG. 14, a time period from 10:05 to 10:10 is registered as the free time of the computing node CN3. A part different from FIG. 13 is shaded.

When a free time of the computing node CN2 is added in the state illustrated in FIG. 14, entries for the computing node CN2 are added to the assignment table, resulting in a state illustrated in FIG. 15. In FIG. 15, a time period from 10:20 to 10:25 is registered as the free time of the computing node CN2. A part different from FIG. 14 is shaded.

For example, data illustrated in FIG. 16 is eventually stored in the assignment table. In FIG. 16, the time period from 10:00 to 10:10 is registered as the free time of the computing node CN1. The time period from 10:20 to 11:00 is registered as the free time of the computing node CN2. The time period from 10:05 to 10:10 is registered as the free time of the computing node CN3. When S59 is executed in this state, $T_{sum}$ is 55 minutes.

Referring back to FIG. 11, the second scheduler 113 calculates $T_{sum}=T_{sum}+$unit time (S59).

The second scheduler 113 then determines whether $T_{all}$ is shorter than $T_{sum}$ (S61). When it is determined that $T_{all}$ is not shorter than $T_{sum}$ (S61: No route), the processing returns to S49 in FIG. 9 via a terminal B, to add the free state of the computing node 31. On the other hand, when determining that $T_{all}$ is shorter than $T_{sum}$ (S61: Yes route), the assignment of the computing node 31 to the preprocessing is completed and therefore, the second scheduler 113 executes the following processing. Specifically, the second scheduler 113 replaces the data stored in the resource-map storage section 109, with the data stored in the temporary data storage section 111 (S62). The processing then shifts to S63 in FIG. 17 via a terminal C.

Next, S63 will be described. The second scheduler 113 identifies one not-yet-processed file, from among the files to be used for the parallel processing (FIG. 17: S63).

The second scheduler 113 identifies the one computing node 31 whose amount of transferable data is not 0, based on the assignment table (S65).

The second scheduler 113 determines whether the amount of data transferable by the computing node 31 identified in S65 is equal to or less than the size of a part, to which the computing node 31 is not assigned, of the file identified in S63 (S67).

When determining that the amount of data transferable by the identified computing node 31 is equal to or less than the size of the part, to which the computing node 31 is not assigned, of the identified file (S67: Yes route), the second scheduler 113 executes the following processing. Specifically, the second scheduler 113 sets 0, as the amount of data that is transferable by the computing node 31 identified in S65, and stored in the assignment table (S69).

The second scheduler 113 adds an entry for the computing node 31 identified in S65, to a transfer table stored in the transfer-table storage section 115 (S71). At this moment, of the file identified in S63, the size of the part to which the computing node 31 is not assigned is reduced by the amount of data transferable by the computing node 31 identified in S65.

FIG. 18 illustrates an example of the data stored in the transfer table. In the example of FIG. 18, the stored data includes a processing type, identification information of the computing node 31, identification information of a file, information representing a file size, information representing a start position of transfer, and information representing a transfer data amount.

Referring back to FIG. 17, the second scheduler 113 determines whether the computing node 31 whose amount of transferable data is not 0 is present in the assignment table (S73). When determining that the computing node 31 whose amount of transferable data is not 0 is present (S73: Yes route), the second scheduler 113 returns to S65, to process the next computing node 31. On the other hand, when determining that the computing node 31 whose amount of transferable data is not 0 is absent (S73: No route), the assignment is completed and therefore, the processing returns to the calling processing.

On the other hand, when determining that the amount of data transferable by the identified computing node 31 is greater than the size of the part, to which the computing node 31 is not assigned, of the identified file (S67: No route), the second scheduler 113 executes the following processing. Specifically, the second scheduler 113 subtracts the size of the part, to which the computing node 31 is not assigned, of the identified file, from the amount of data transferable by the identified computing node 31 (S75).

The second scheduler 113 adds an entry for the computing node 31 identified in S65, to the transfer table (S77). At this moment, the size of the part, to which the computing node 31 is not assigned, of the file identified in S63 is 0.

The second scheduler 113 determines whether there is a not-yet-processed file among the files to be used for the parallel processing (S79). When it is determined that there is a not-yet-processed file (S79: Yes route), the flow returns to S63. On the other hand, when it is determined that there is no not-yet-processed file (S79: No route), the assignment is completed and therefore, the processing returns to the calling processing.

Here, state transitions of the assignment table will be described using FIG. 19 to FIG. 23.

Assume that, for example, in the state illustrated in FIG. 16, the computing node CN1 is assigned to a file 1 in a size of 50 GB. This brings the assignment table into a state illustrated in FIG. 19. In FIG. 19, the amount of data transferable by the computing node CN1 is changed from 60 GB to 10 GB. A part different from FIG. 16 is shaded.

Assume that, in the state illustrated in FIG. 19, the computing node CN3 is assigned to a file 2 in a size of 180 GB. This brings the assignment table into a state illustrated in FIG. 20. In FIG. 20, the amount of data transferable by the computing node CN3 is changed from 30 GB to 0 GB. At this moment, a part, to which the computing node 31 is not assigned, of the file 2 is 150 GB. A part different from FIG. 19 is shaded.

Assume that, in the state illustrated in FIG. 20, the computing node CN1 is assigned to the part, to which the computing node 31 is not assigned to, of the file 2. This brings the assignment table into a state illustrated in FIG. 21. In FIG. 21, the amount of data transferable by the computing node CN1 is changed from 10 GB to 0 GB. The part, to which the computing node 31 is not assigned, of the file 2 is 140 GB. A part different from FIG. 20 is shaded.

Assume that, in the state illustrated in FIG. 21, the computing node CN2 is assigned to the part, to which the computing node 31 is not assigned to, of the file 2. This brings the assignment table into a state illustrated in FIG. 22. In FIG. 22, the amount of data transferable by the computing node CN2 is changed from 240 GB to 100 GB. A part different from FIG. 21 is shaded.

Assume that, in the state illustrated in FIG. 22, the computing node CN2 is assigned to a file 3 in a size of 50 GB. This brings the assignment table into a state illustrated in FIG. 23. In FIG. 23, the amount of data transferable by the computing node CN2 is changed from 100 GB to 50 GB. A part different from FIG. 22 is shaded.

By executing the processing described above, the computing node 31 in an idle state before the start time of the parallel processing may be assigned to the preprocessing.

Referring back to FIG. 7, the second scheduler 113 determines whether the assignment of the computing node 31 to the preprocessing is successful (S9). The assignment to the preprocessing is unsuccessful when the processing takes the No route in S51, whereas the assignment to the preprocessing is successful when the processing takes the No route in S73.

When determining that the assignment of the computing node 31 to the preprocessing is unsuccessful (S9: No route), the second scheduler 113 sets a time that is later than the start time by the unit time, as the start time T of the parallel processing (S11). In other words, the start time T of the parallel processing is delayed by the unit time. The second scheduler 113 generates a copy of the data stored in the resource-map storage section 109. The second scheduler 113 then updates this copy, based on a processing result of S11, and updates the data in the temporary data storage section 111, with data after the update.

On the other hand, when determining that the assignment of the computing node 31 to the preprocessing is successful (S9: Yes route), the second scheduler 113 assigns, to the postprocessing, the computing node 31 not yet assigned at or after a finish time of the parallel processing (S13). The processing then ends.

In S13, the second scheduler 113 searches for the computing node 31 satisfying a condition for the postprocessing. The condition for the postprocessing includes, for example, a condition of the number of the computing nodes 31 to execute the postprocessing, and a condition of a time length to be taken by the postprocessing. In the example of FIG. 5, a part indicating "node=n3, time=m3" in the line beginning with "#after" corresponds to the condition for the postprocessing. This avoids assigning the same number of the computing nodes 31 as the number of the computing nodes 31 that execute the parallel processing, to the postprocessing. The computing node 31 not yet assigned during a period of executing the postprocessing is assigned to preprocessing of the next parallel job, and therefore, the computing node 31 may be effectively used.

As described above, there is a case where securing the same number of the computing nodes 31 as the number of the computing nodes 31 that execute the parallel processing may be unnecessary, for the processing except for the parallel processing. In other words, there is a case of n1<n2 and n2<n3. In such a case as well, if the computing node 31 is assigned job by job, the computing node 31 in an idle state is present in the processing except for the parallel processing, so that a usage rate of the computing node 31 decreases in the information processing system 3.

However, by executing the processing described above, the preprocessing may be executed in a period in which the n2 computing nodes 31 are not securable. As for the postprocessing, the computing node 31 is assigned according to the condition for the postprocessing, and therefore, the computing node 31 may be effectively used.

Figure 24:
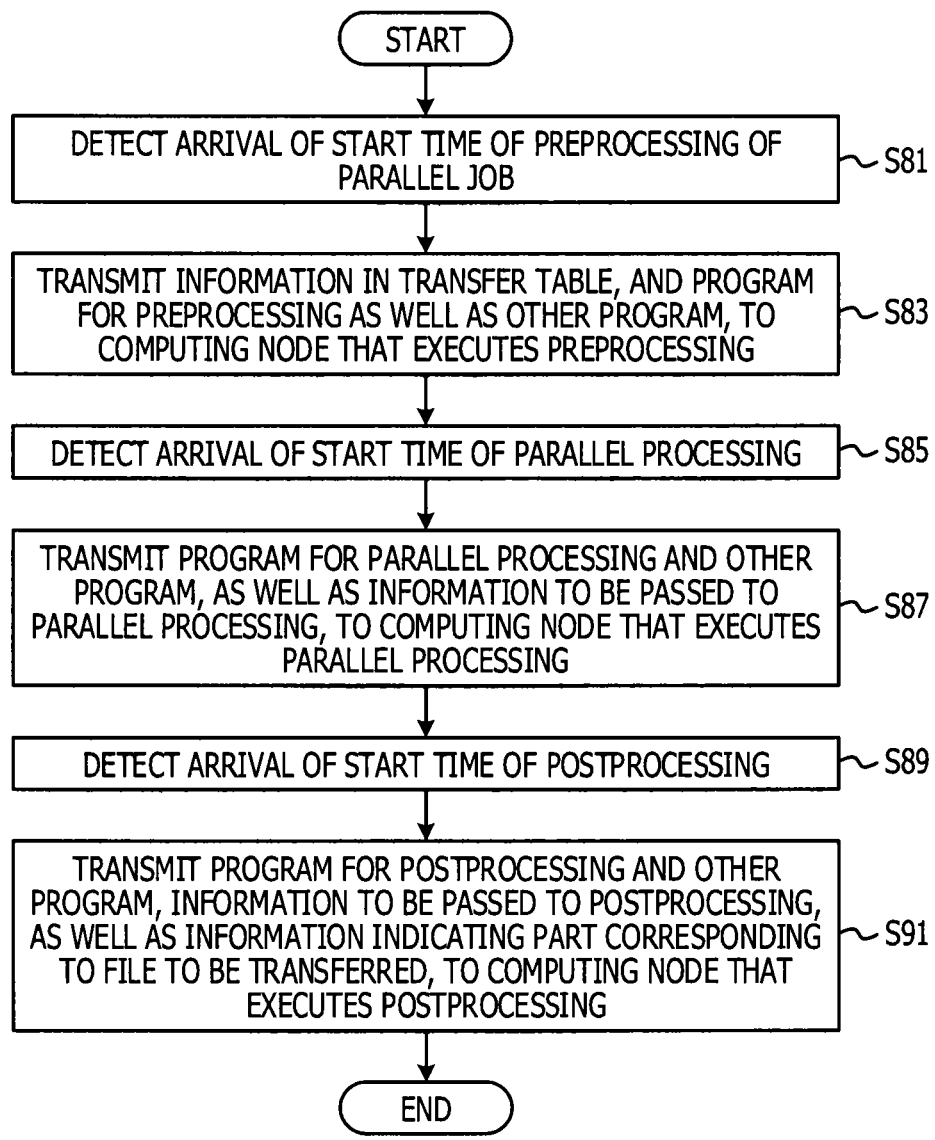
FIG. 24 is a diagram illustrating a processing flow of processing to be executed by an execution control section.

Next, processing to be performed by the execution control section 119 to control execution of a parallel job will be described using FIG. 24.

First, the execution control section 119 refers to data stored in the resource-map storage section 109. Next, the execution control section 119 detects arrival of a start time of preprocessing of a certain parallel job (hereinafter referred to as "parallel job A") (FIG. 24: S81).

The execution control section 119 transmits information stored in a transfer table, and a program for the preprocessing as well as other program stored in the post-division data storage section 105, to the computing node 31 that executes the preprocessing (S83). When the number of the computing nodes 31 to execute the preprocessing is two or more, the execution control section 119 transmits information about each of the computing nodes 31, which is included in the information stored in the transfer table, to the corresponding computing node 31. This allows the computing node 31 having received the data transmitted in S83, to execute the preprocessing appropriately.

Next, the execution control section 119 refers to the data stored in the resource-map storage section 109. The execution control section 119 then detects arrival of a start time of parallel processing of the parallel job A (S85).

The execution control section 119 transmits a program for the parallel processing and the other program stored in the post-division data storage section 105, as well as information received from the API control section 121 to be passed from the preprocessing to the parallel processing, to the computing node 31 that executes the parallel processing (S87). This allows the computing node 31 having received the data transmitted in S87, to execute the parallel processing appropriately.

Next, the execution control section 119 refers to the data stored in the resource-map storage section 109. The execution control section 119 then detects arrival of a start time of postprocessing of the parallel job A (S89).

The execution control section 119 receives information to be passed from the parallel processing to the postprocessing (this information includes information indicating a size of a file after the parallel processing) from the API control section 121, and determines a part corresponding to the file to be transferred by each of the computing nodes 31 that execute the postprocessing. The execution control section 119 then transmits, to each of the computing nodes 31 that execute the postprocessing, a program for the postprocessing and the other program stored in the post-division data storage section 105, information to be passed from the parallel processing to the postprocessing, as well as information indicating the part corresponding to the file to be transferred (S91). This allows the computing node 31 having received the data transmitted in S91, to execute the postprocessing appropriately. The processing then ends.

By executing the processing described above, a parallel job may be appropriately executed, even if a parallel-job execution program is divided.

The embodiment has been described above, but is not limitative. For example, there is also a case where the above-described function block configuration of each of the management apparatus 1 and the file management apparatus 5 does not match with an actual program module configuration.

The configuration of each of the tables described above is an example, and each of the tables may have a configuration different from the configuration described above. Further, the sequence of steps in each of the processing flows may be altered if the processing results do not change. Furthermore, the steps may be executed in parallel.

In S11, it may be determined whether the condition for the parallel processing is satisfied, when the start time T of the parallel processing is delayed by the unit time. In this case, when the condition for the parallel processing is not satisfied, a free resource satisfying the condition for the parallel processing may be searched for again after the start time T of the parallel processing.

The assignment of the computing node 31 to the postprocessing may be performed in a manner similar to the assignment of the computing node 31 to the preprocessing. In other words, the computing nodes 31 may be sequentially assigned to the postprocessing, starting from the one whose start time of a free state is earlier. In this case, in a manner similar to S83, the execution control section 119 transmits information in a transfer table generated for the postprocessing, to the computing node 31 that executes the postprocessing.

Figure 25:
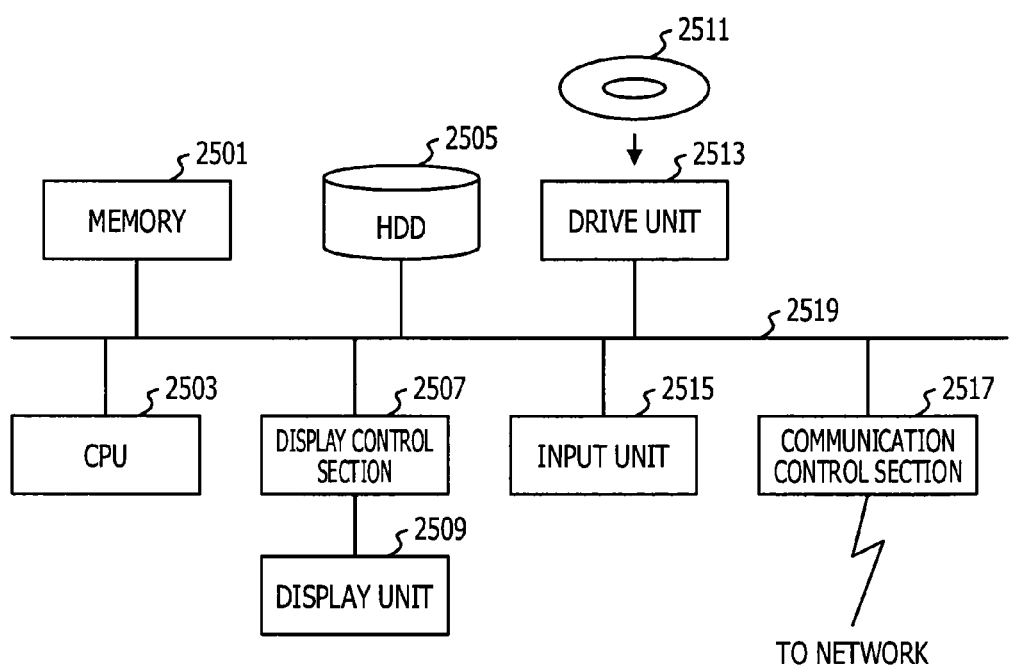
FIG. 25 is a functional block diagram of a computer.

Each of the management apparatus 1, the computing node 31, the file management apparatus 5, and the user terminal 9 that are described above is a computer apparatus. As illustrated in FIG. 25, a memory 2501, and a central processing unit (CPU) 2503, a hard disk drive (HDD) 2505, a display control section 2507 connected to a display unit 2509, a drive unit 2513 for a removable disk 2511, an input unit 2515, and a communication control section 2517 for connection to a network are connected by a bus 2519. An operating system (OS) and an application program to execute the processing in the present embodiment are stored in the HDD 2505. When being executed by the CPU 2503, the application program is read from the HDD 2505 into the memory 2501. The CPU 2503 controls the display control section 2507, the communication control section 2517, and the drive unit 2513 according to processing contents of the application program, thereby causing these elements to perform predetermined operation. Data in course of processing is mainly stored in the memory 2501, but may be stored in the HDD 2505. In the embodiment, the application program for execution of the above-described processing is distributed by being stored in the removable disk 2511 readable by a computer. The application program is then installed onto the HDD 2505 from the drive unit 2513. The application program may be installed onto the HDD 2505, via a network such as the Internet, and the communication control section 2517. Such a computer apparatus implements the various functions described above, by performing organic cooperation between hardware such as the CPU 2503 and the memory 2501, and programs such as the OS and the application program.

The above-described embodiment is summarized as follows.

According to a first aspect of the present embodiment, an information processing system includes (A) two or more information processing apparatuses, and (B) a management apparatus. Further, the management apparatus includes (b1) a data storage section that stores information about processing to be executed by each of the two or more information processing apparatuses and information about a period in which the processing is to be executed, (b2) an identification section that identifies a first time that is a time at which a predetermined number of information processing apparatuses that execute parallel processing are securable, by using information stored in the data storage section, and (b3) an assignment section that identifies one or more first processing apparatuses each having a first period, which is earlier than the first time and in which no processing is to be executed, by using information stored in the data storage section, and assigns the first period of each of the one or more first processing apparatuses, to first processing to be executed before the parallel processing.

For the processing to be executed before the parallel processing (for example, preprocessing of the parallel processing), the same number of information processing apparatuses as the number of information processing apparatuses that execute the parallel processing may not be secured in some cases. Providing the above-describe configuration allows the first processing to be executed in a period in which the predetermined number of information processing apparatuses are not securable, and therefore, the information processing apparatus may be effectively used.

The above-described assignment section may (b2-1) calculate a time length to be taken when one information processing apparatus among the two or more processing apparatuses executes the first processing, (b2-2) determine whether a condition that the calculated time is shorter than a sum of the first periods of the one or more first information processing apparatuses is satisfied, and (b2-3) set a time that is later than the first time by a predetermined time, as the first time, when the condition is not satisfied. This allows the parallel processing to start at the earliest time, while securing a sufficient number of information processing apparatuses, for execution of the first processing.

The above-described management apparatus may further include (b4) a division section that divides a program of a job to be executed, into a program for the parallel processing and a program for the first processing, and (b5) a transmission section that transmits the program for the parallel processing to a predetermined number of information processing apparatuses that execute the parallel processing, and transmits the program for the first processing to the one or more first information processing apparatuses.

In this configuration, the information processing apparatus having executed the first processing may not necessarily execute the parallel processing, and therefore, the processing to be executed may be flexibly executed.

The above-described transmission section may (b4-1) receive, from the one or more first information processing apparatuses, information to be passed from the first processing to the parallel processing, and transmit, to the predetermined number of information processing apparatuses that execute the parallel processing, the information to be passed from the first processing to the parallel processing. This allows the parallel processing to be performed appropriately, even when the program for the first processing and the program for the parallel processing are not integral with each other.

The first processing may include processing of transferring one or more data blocks to be used in the parallel processing, and the condition may include a condition that a transfer time calculated by dividing a total size of the one or more data blocks by a transfer rate is shorter than the sum of the first periods of the one or more first information processing apparatuses. This allows transfer of data blocks in the first processing without omission.

The above-described assignment section may (b2-4) determine, for each of the one or more first information processing apparatuses, an amount of data to be transferred by the first information processing apparatus, and a part, which is to be transferred by the first information processing apparatus, of the one or more data blocks, and the above-described transmission section may (b2-4) transmit, to each of the one or more first information processing apparatuses, information representing the amount of data to be transferred by the first information processing apparatus, and information representing the part, which is to be transferred by the first information processing apparatus, of the one or more data blocks. This may avoid transferring a data block by mistake.

The first time may be an earliest time at which the predetermined number of information processing apparatuses that execute the parallel processing are securable.

The above-described identification section may specify the first time, to avoid presence of an information processing apparatus that does not execute the parallel processing, among the predetermined number of information processing apparatuses that execute the parallel processing. This allows suppression of generation of a communication processing load, in a computing node that does not execute the parallel processing.

According to a second aspect of the present embodiment, a method of controlling an information processing system is executed by a management apparatus, in the information processing system including two or more information processing apparatuses and the management apparatus. Further, the method of controlling the information processing system includes (C) specifying a first time that is a time at which a predetermined number of information processing apparatuses that execute parallel processing are securable, by using information stored in a data storage section that stores information about processing to be executed by each of the information processing apparatuses and information about a period in which the processing is to be executed, (D) specifying one or more first information processing apparatuses each having a first period, which is earlier than the first time and in which no processing is to be executed, by using information stored in the data storage section, and (E) assigning the first period of each of the one or more first information processing apparatuses, to first processing to be executed before the parallel processing.

A program that causes a computer to perform processing based on the above-described method may be created. This program is stored in a computer-readable storage medium or storage device such as, a flexible disk, a compact disc-read-only memory (CD-ROM), a magneto-optical (MO) disk, a semiconductor memory, and a hard disk, for example. Intermediate processing results are temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A management method executed by a management apparatus that manages a plurality of information processing apparatuses, the management method comprising:
    specifying a first time that is a time at which a predetermined number of information processing apparatuses that execute parallel processing are securable, by referring to information associating a content of processing to be executed by each of the plurality of information processing apparatuses, with a period in which the processing is to be executed;
    specifying one or more information processing apparatuses respectively having a first period, which is earlier than the first time and in which no processing is to be executed, from among the plurality of information processing apparatuses;
    assigning the first period of each of the one or more information processing apparatuses, to preprocessing to be executed before the parallel processing;
    calculating a time length to be taken when one information processing apparatus among the plurality of information processing apparatuses executes the preprocessing;
    determining whether a condition that the calculated time is shorter than a sum of the first periods of the one or more information processing apparatuses is satisfied; and
    updating the first time with a time that is later than the first time by a predetermined time, when determining that the condition is not satisfied.

2. The management method according to claim 1, wherein
    the preprocessing includes processing of transferring one or more data blocks to be used in the parallel processing, and
    the condition includes a condition that a transfer time calculated by dividing a total size of the one or more data blocks by a transfer rate is shorter than the sum of the first periods of the one or more information processing apparatuses.

3. The management method according to claim 2, further comprising:
    determining, for each of the one or more information processing apparatuses, an amount of data to be transferred by the information processing apparatus, and a part, which to be transferred by the information processing apparatus, of the one or more data blocks; and
    transmitting, to each of the one or more information processing apparatuses, information representing the amount of data to be transferred by the information processing apparatus, and information representing the part, which is to be transferred by the information processing apparatus, of the one or more data blocks.

4. The management method according to claim 1, further comprising:

dividing a program of a job to be executed, into a program for the parallel processing and a program for the preprocessing;

transmitting the program for the parallel processing to a predetermined number of information processing apparatuses that execute the parallel processing; and transmitting the program for the preprocessing to the one or more information processing apparatuses.

5. The management method according to claim 4, further comprising:

receiving, from the one or more information processing apparatuses, information to be passed from the preprocessing to the parallel processing; and transmitting, to the predetermined number of information processing apparatuses that execute the parallel processing, the information to be passed from the preprocessing to the parallel processing.

6. The management method according to claim 1, wherein the first time is an earliest time at which the predetermined number of information processing apparatuses that execute the parallel processing are securable.

7. The management method according to claim 1, wherein the specifying the first time includes specifying the first time, to avoid presence of an information processing apparatus that does not execute the parallel processing, among the predetermined number of information processing apparatuses that execute the parallel processing.

8. A management apparatus that manages a plurality of information processing apparatuses, the management apparatus comprising:

a memory; and a processor coupled to the memory and configured to:

specify a first time that is a time at which a predetermined number of information processing apparatuses that execute parallel processing are securable, by referring to information associating a content of processing to be executed by each of the plurality of information processing apparatuses, with a period in which the processing is to be executed;

specify one or more information processing apparatuses each having a first period, which is earlier than the first time and in which no processing is to be executed, from among the plurality of information processing apparatuses; and assign the first period of each of the one or more information processing apparatuses, to preprocessing to be executed before the parallel processing;

calculate a time length to be taken when one information processing apparatus among the plurality of information processing apparatuses executes the preprocessing;

determine whether a condition that the calculated time is shorter than a sum of the first periods of the one or more information processing apparatuses is satisfied; and update the first time with a time that is later than the first time by a predetermined time, when determining that the condition is not satisfied.

9. The management apparatus according to claim 8, wherein the preprocessing includes processing of transferring one or more data blocks to be used in the parallel processing, and the condition includes a condition that a transfer time calculated by dividing a total size of the one or more data blocks by a transfer rate is shorter than the sum of the first periods of the one or more information processing apparatuses.

10. The management apparatus according to claim 9, wherein the processor is configured to:

determine, for each of the one or more information processing apparatuses, an amount of data to be transferred by the information processing apparatus, and a part, which to be transferred by the information processing apparatus, of the one or more data blocks; and transmit, to each of the one or more information processing apparatuses, information representing the amount of data to be transferred by the information processing apparatus, and information representing the part, which is to be transferred by the information processing apparatus, of the one or more data blocks.

11. The management apparatus according to claim 8, wherein the processor is configured to:

divide a program of a job to be executed, into a program for the parallel processing and a program for the preprocessing;

transmit the program for the parallel processing to a predetermined number of information processing apparatuses that execute the parallel processing; and transmit the program for the preprocessing to the one or more information processing apparatuses.

12. The management apparatus according to claim 11, wherein the processor is configured to:

receive, from the one or more information processing apparatuses, information to be passed from the preprocessing to the parallel processing; and transmit, to the predetermined number of information processing apparatuses that execute the parallel processing, the information to be passed from the preprocessing to the parallel processing.

13. The management apparatus according to claim 8, wherein the first time is an earliest time at which the predetermined number of information processing apparatuses that execute the parallel processing are securable.

14. The management apparatus according to claim 8, wherein the processor is configured to specify the first time, to avoid presence of an information processing apparatus that does not execute the parallel processing, among the predetermined number of information processing apparatuses that execute the parallel processing.

15. An information processing system, comprising:

a plurality of information processing apparatuses; and a management apparatus configured to manage the plurality of information processing apparatuses, wherein the management apparatus includes a memory, and a processor coupled to the memory and configured to:

specify a first time that is a time at which a predetermined number of information processing apparatuses that execute parallel processing are securable, by referring to information associating a content of processing to be executed by each of the plurality of information processing apparatuses, with a period in which the processing is to be executed;

specify one or more information processing apparatuses each having a first period, which is earlier than the first time and in which no processing is to be executed, from among the plurality of information processing apparatuses;

assign the first period of each of the one or more information processing apparatuses, to preprocessing to be executed before the parallel processing;

calculate a time length to be taken when one information processing apparatus among the plurality of information processing apparatuses executes the preprocessing;

determine whether a condition that the calculated time is shorter than a sum of the first periods of the one or more information processing apparatuses is satisfied; and update the first time with a time that is later than the first time by a predetermined time, when determining that the condition is not satisfied.

16. The information processing system according to claim 12, wherein the preprocessing includes processing of transferring one or more data blocks to be used in the parallel processing, and the condition includes a condition that a transfer time calculated by dividing a total size of the one or more data blocks by a transfer rate is shorter than the sum of the first periods of the one or more information processing apparatuses.

17. The information processing system according to claim 16, wherein the processor is configured to:

determine, for each of the one or more information processing apparatuses, an amount of data to be transferred by the information processing apparatus, and a part, which to be transferred by the information processing apparatus, of the one or more data blocks; and transmit, to each of the one or more information processing apparatuses, information representing the amount of data to be transferred by the information processing apparatus, and information representing the part, which is to be transferred by the information processing apparatus, of the one or more data blocks.

18. The information processing system according to claim 12, wherein the processor is configured to:

divide a program of a job to be executed, into a program for the parallel processing and a program for the preprocessing;

transmit the program for the parallel processing to a predetermined number of information processing apparatuses that execute the parallel processing; and transmit the program for the preprocessing to the one or more information processing apparatuses.

19. The information processing system according to claim 18, wherein the processor is configured to:

receive, from the one or more information processing apparatuses, information to be passed from the preprocessing to the parallel processing; and transmit, to the predetermined number of information processing apparatuses that execute the parallel processing, the information to be passed from the preprocessing to the parallel processing.

20. The information processing system according to claim 12, wherein the first time is an earliest time at which the predetermined number of information processing apparatuses that execute the parallel processing are securable.

\* \* \* \* \*